United States Patent [19]

Tay

[11] Patent Number: 6,097,780
[45] Date of Patent: Aug. 1, 2000

[54] TRACK COUNTER

[75] Inventor: Hiok-Nam Tay, Singapore, Singapore

[73] Assignee: Texas Instruments Incorporated, Dallas, Tex.

[21] Appl. No.: 09/135,997

[22] Filed: Aug. 18, 1998

[51] Int. Cl.[7] .................................................. G06M 3/00
[52] U.S. Cl. ................................. 377/3; 377/10; 377/30
[58] Field of Search ..................................... 377/3, 10, 30

[56] References Cited

U.S. PATENT DOCUMENTS

| | | | |
|---|---|---|---|
| 5,001,732 | 3/1991 | Nomura et al. | 377/3 |
| 5,136,440 | 8/1992 | Sidman | 360/78.04 |

Primary Examiner—Margaret R. Wambach
Attorney, Agent, or Firm—W. Daniel Swayze, Jr.; W. James Brady, III; Frederick J. Telecky, Jr.

[57] ABSTRACT

The track counter circuit of the present invention is for counting tracks. The circuit indicates a circuit for generating a first signal indicating a first track has been crossed and a second signal indicating a second track has been crossed after the first track, a circuit for determining when a third track should have been crossed and generating a missing signal to indicate the third track, a circuit for determining a valid track period based on the first signal and the second signal, and a circuit for maintaining the valid track period when said missing signal is generated. The track counter circuit for counting tracks may use the first signal as a MIRR signal. Additionally, the second signal may be a MIRR signal.

8 Claims, 4 Drawing Sheets

TRACK COUNTER

FIELD OF THE INVENTION

The present invention relates to sensing signals recorded on a disk and applying the sensed signals as an indication of track crossing, and in particular for a track counter for detecting track crossings from an optical disk.

DESCRIPTION OF THE PRIOR ART

In an optical disk apparatus or an optical magnetic apparatus, data patterns such as pits or marks are arranged in concentric circular or spiral tracks. Light beam is focused onto the disk surface and positioned to follow the track as the disk is rotated. The reflected light intensity modulated by the patterns scanned by the beam spot carries information that is subsequently recovered by the data recovery system.

Data is arranged in groups, for example sectors, from inner tracks to outer tracks. Each sector is typically assigned a sequential number, for example sector address that increases from a predetermined number to a maximum number corresponding to the maximum number of sectors recorded on the disk.

When starting to play back a disk, optical disk player, such as CD players or DVD players, read and store TOC (table of contents) data before playback from a lead-in area of the currently set disk. Upon access to a desired track based on a search command, the microprocessor in the optical disk player uses the current sector address to find the current track number and target sector address to find the target track number. The difference between the two track numbers allows the microprocessor to find the number of tracks to be jumped. Accordingly, the computer drives the optical system of the player to jump the calculated number of tracks in order to reach the target track. The determination of the number of tracks jumped upon jumps operation requires detecting the traverse operation of the optical pickup spot across the tracks.

With the spreading use of optical disk drives as an external storage unit for computers, the demand for compact and high-speed data access has increased. While seeking, the beam spot crosses over patterns, for example pits, of varying sizes that interfere in different amount with the track cross signal. This interference can lead to spurious pulses in the track cross signal and can thus erroneous track counting. Furthermore, black spots which occur from dust or fiber may number in the hundreds on the disk. This can lead to a large number of errors in the track count. There is therefore need for an error-free track count circuit.

OBJECTS OF THE INVENTION

It is an object of the present invention to provide a disk player capable of accurately retrieving desired information among a plurality of tracks of information recorded on a disk.

Another object of the present invention is to provide a track counter circuit capable of accurately counting the number of tracks a pickup has crossed. Furthermore, it is an object of the present invention to provide a track counter circuit capable of accurately counting the number of tracks a pickup has crossed even through the pickup accesses and move across the track at high speeds and crosses black spots caused by dust or fiber without changing the number of tracks.

Furthermore, it is an object of the present invention to maintain a track valid period which is the time between valid two tracks. These valid two tracks cause two valid pulses indicating tracks.

The track counter circuit of the present invention is for counting tracks. The circuit indicates a circuit for generating a first signal indicating a first track has been crossed and a second signal indicating a second track has been crossed after the first track, a circuit for determining when a third track should have been crossed and generating a missing signal to indicate the third track, a circuit for determining a valid track period based on the first signal and the second signal, and a circuit for maintaining the valid track period when said missing signal is generated. The track counter circuit for counting tracks may use the first signal as a MIRR signal. Additionally, the second signal may be a MIRR signal.

The foregoing and other objects, features, aspects and advantages of the present invention will become more apparent from the following detailed description of the present invention when taken in conjunction with the accompanying drawings.

DETAIL DESCRIPTION OF THE INVENTION

Figure 2:
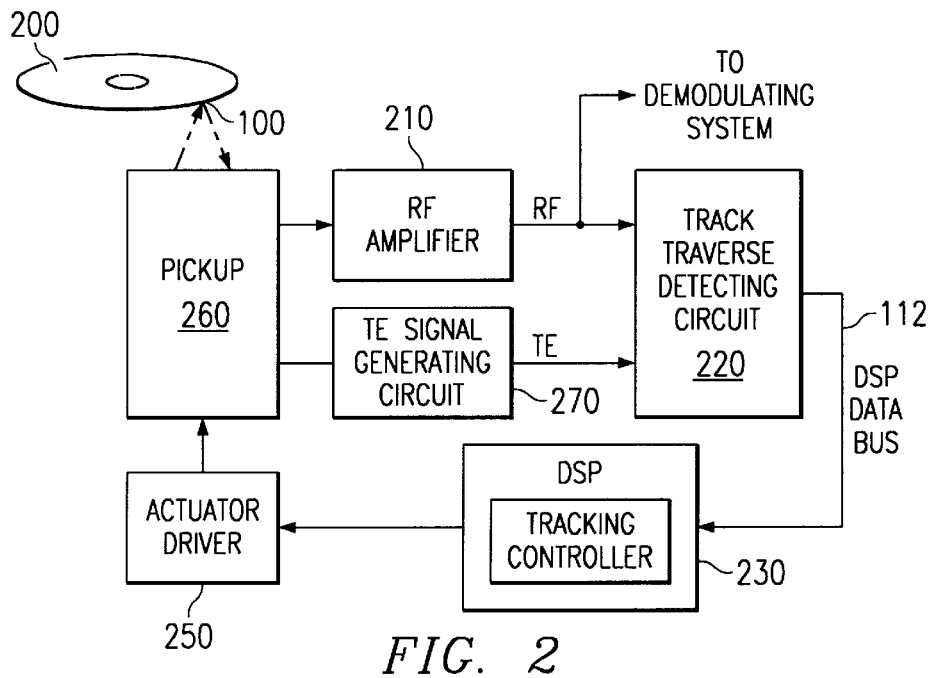
FIG. 2 illustrates an optical system of the present invention.
Figure 3:
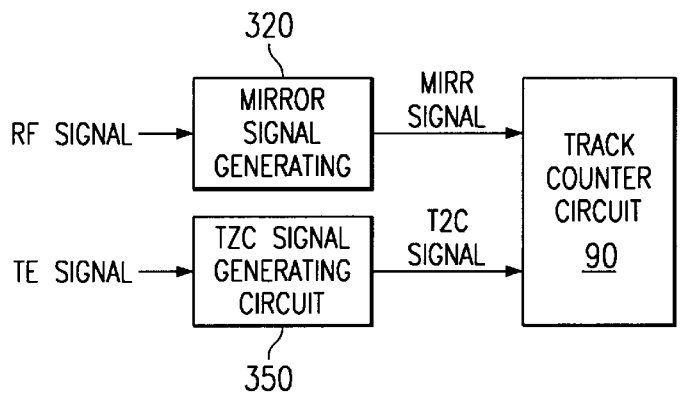
FIG. 3 illustrates another circuit according to the invention.

In FIG. 2, the information recorded on disk 200 is read by pickup device 260 as an information signal. The pickup device 260 as a result of the read operation and in response to the information signal generates a RF signal which is input to RF amplifier 210. The TE signal generating circuit 270 receives input from multiple photodetector signals of the pickup 260. There are various ways to generate TE signal. One example (3-beam method for CD) is TE=E−F where TE passed through a lowpass filter, and where E and F are photodetector outputs corresponding to two satellite beams. Another is the DPD (for DVD-ROM), which is TE=phase (A)−phase(B)+phase(C)−phase(D) and passed through a lowpass filter. Then there is the push-pull method, which is TE=A−B−C+D passed through a lowpass filter. On the other hand, RF normally is generated as RF=A+B+C+D (without the lowpass filter). The tracking error generating circuit 270 generates a tracking error (TE) signal based on the output of pickup 260. The TE signal has a sine curve characteristic such as shown in FIG. 4c. The TE signal is input to the track traverse detecting circuit 220. Additionally, the RF signal which is output from the RF amplifier 210 is input to the track traverse detecting circuit 220. The track traverse detecting circuit 220 is coupled to DSP 230 via DSP data bus 112. The DSP 230 includes tracking controller 240. Accordingly, the tracking controller 240 operates a tracking actuator 250 to move the pickup 260 across the disk 200. FIG. 3 illustrates that the RF signal and the TE signal are input to the MIRR generating circuit 320 and the TZC generating circuit 350, respectively.

The output of the TZC signal generating circuit 350 is a TZC signal, and this signal is input to track counter circuit 90.

Figure 4A:
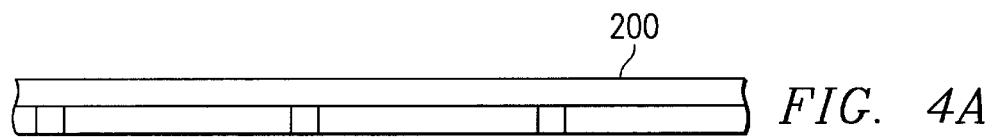
FIG. 4 illustrates waveforms corresponding to the disk.
Figure 4B:
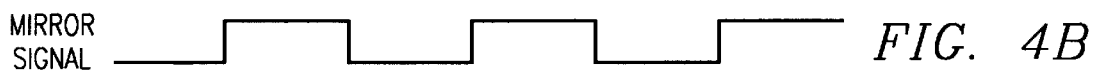
Figure 4C:

The mirror generator circuit 320 of FIG. 3 generates a heightened level signal as illustrated in FIG. 4b by detecting a mirror face between tracks (pit area) on disk 200. The MIRR signal is high when the optical spot is irradiated at the disk mirror face (area between tracks or pit arrays) and is low when the optical spot is irradiated at a track. This MIRR signal is input to the track counter circuit 90.

Figure 1:
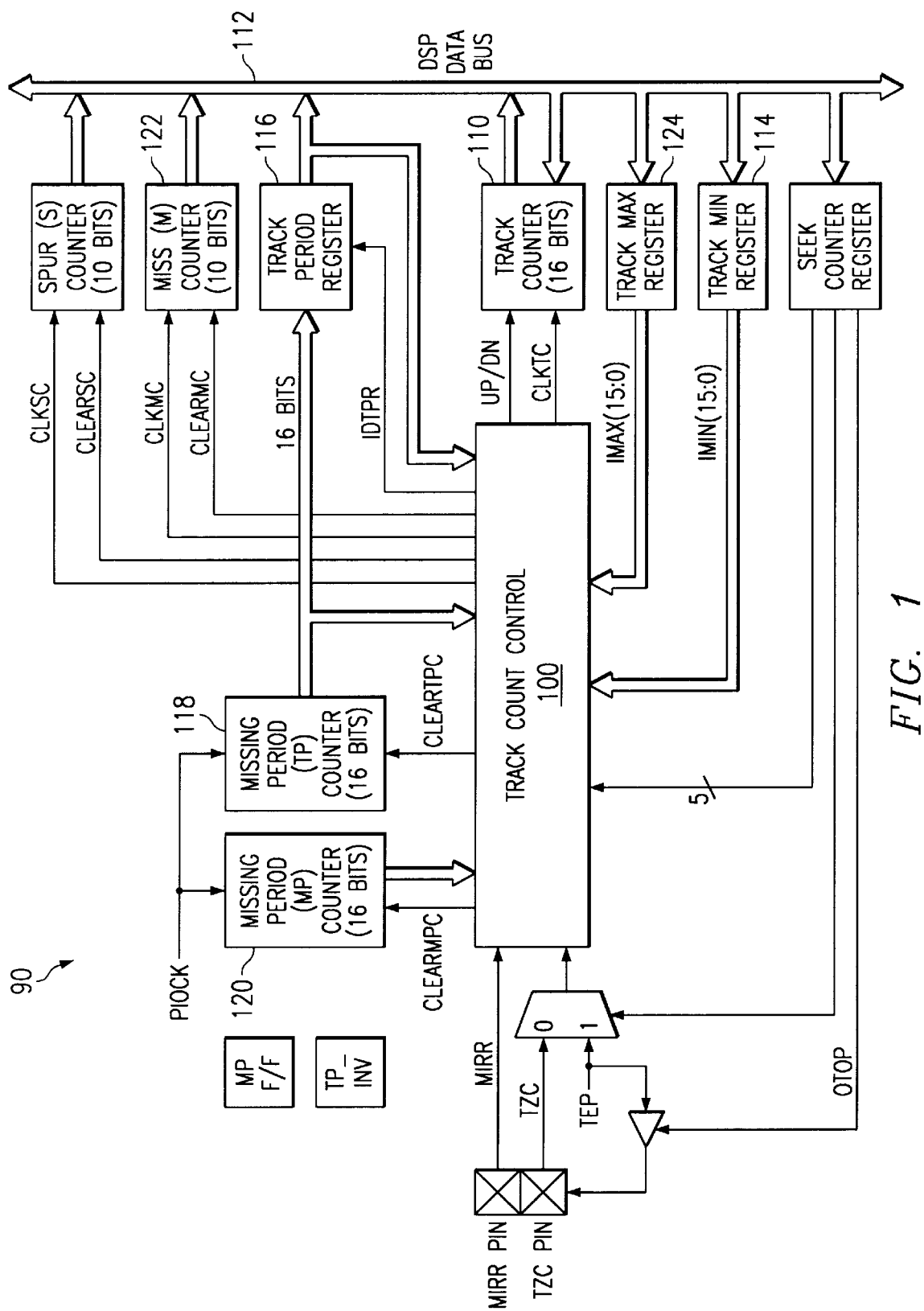
FIG. 1 is a block diagram showing a configuration of a track counting circuit of the present invention.

As illustrated in FIG. 1, the MIRR signal is inputted to the track control circuit 100. The track period counter 118 is coupled to the track counter control circuit 100. The track period counter 118 counts a series of clock pulses which may be set at a higher frequency than the frequency of the MIRR signal. The track period counter 118 counts up and is activated from a rising edge of the MIRR signal to the next or second rising edge of the MIRR signal which stops the track period counter 118 from counting. At the time when the second rising edge is received by the track counter control circuit 100, the track period counter 118 stops counting and loads the value from the track period counter 118 into the track period register 116. The track control circuit 100 then clears the track period counter 118. The track period counter 118 again counts the clock signals until the next MIRR rising edge.

Figure 5:
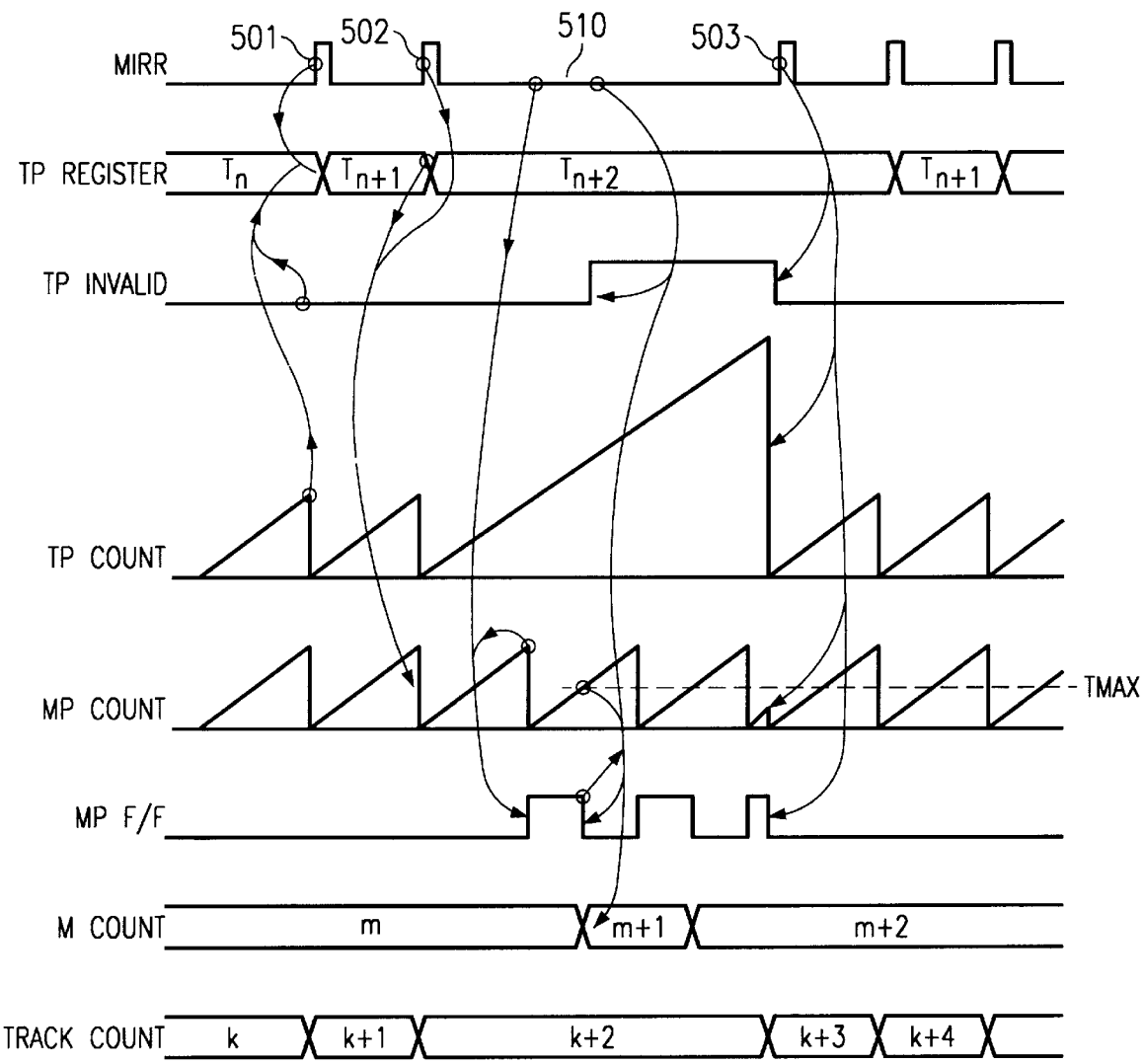
FIG. 5 illustrates waveforms of the circuits of FIG. 1.

The track period register 116 is loaded from the track period counter 118 only when valid rising edges of the MIRR signal is received and not after spurious MIRR signals are received nor after one or more pulses are missing. Thus, turning to FIG. 5 the track period register 116 stores the count pulses between rising edge 501 and rising edge 502 and not between rising edge 502 and rising edge 503, where there are two missing MIRR edges.

Thus, the track period register 116 contains a count of clock signals representing the last valid time period. Track period register 116 does not contain an invalid time period since track period register 116 is not changed when a spurious mirror pulse is received nor when pulses are missing.

Furthermore, the missing period counter 120 and the track max register 124 are coupled to the track counter control circuit 100. The missing period counter 120 counts the same clock pulses up to a value of count pulses that are stored in track period register 116, after which the missing period counter 120 is reset by the track count control circuit 100 and then continues counting up again.

Thus, when no MIRR edge has been received during a period of time when the edge was expected, the missing period counter 120 is reset to zero while the track period counter 118 continues to count up. After the first such reset, each time the missing period counter 118 exceeds the value found in the track max register 124, the miss counter 112 is incremented. Thus the miss counter 112 is increment for each pulse missing from the MIRR signal. The track max register 124 allows for variations in the timing of the MIRR edge for example the MIRR edge may arrive slightly later than expected and not be deemed as missing. Similarly, the edge signal could arrive earlier than expected. The value in the track max register 124 is programmed by the DSP from time to time, for instance as approximately 50% of the value of the track period register 116.

For the present invention, the valid period is available in spite of the spurious MIRR edge is received or a missing MIRR edge is detected. With the present invention, there is no need for a DSP or any circuit to calculate the valid period between MIRR signals occur after a missing MIRR signal has been detected. MIRR edges 501 and 502 are determined to be valid because for both instances the track period counter exceeds the value in the track min register, which is programmed by the DSP (from time to time) with a reasonable minimum period value (e.g. 70% of the valid track period) to allow for early edge (i.e. edge that arrives somewhat earlier than the exact period in the track period register).

Consequently, the present invention is very efficient since the valid period of time is always available. The valid period is instantly available when a missing MIRR signal has been detected. When a missing MIRR signal is detected, there is no need to subsequently determine the valid period. Consequently, the valid period is available for use between the time of a missing MIRR signal and when the proper sequence of valid MIRR signals have been reestablished. No DSP intervention is required, and there is no delay in determining the valid period when the value is needed. For example, in-operation, as rising edge 501 of a valid MIRR edge is detected, it is determined to be a valid MIRR edge since it is within the expected time period and consequently the missing period counter 120 and the track period counter 118 are cleared and reset to zero. These counters count up clock pulses until the leading edge of another valid MIRR edge represented by rising edge 502 is received. Since this second MIRR edge is valid, the number of counts in the track period counter 118 is transferred to the track period register 116 and both the track period counter 118 and the missing period counter 120 are again cleared and reset to zero. Both the missing period counter 120 and the track period counter 118 again count up. When the missing period counter 120 reaches the value stored in the track period register 116, there is no MIRR pulse and consequently, the track period counter 118 continues counting while the missing period counter 120 is reset to zero. When the missing period counter 210 again counts up and crosses the track max value, the miss counter 120 is incremented.

Thus, the presently claimed invention is able to determine where tracks should be located by the location of missing MIRR signal during a period of time of missing pulses of the MIRR signal which could be caused by a black spot on the disk. This is determined sufficiently with no DSP intervention and consequently saves time of the DSP and allows for faster frequency disk as well.

Figure 6A:
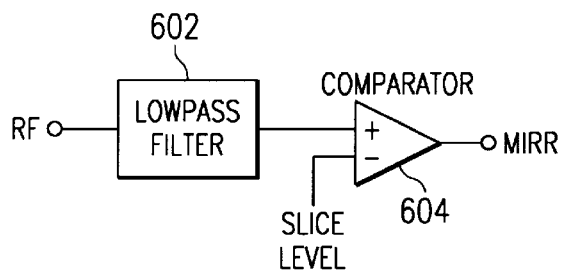
FIG. 6a illustrates another circuit of the present invention.

Furthermore, there is a facility in the track counter for rejecting spurious MIRR edges. There is a track min register 114 coupled to the track control logic 100 and is accessible by the DSP. During seek, DSP determines an appropriate value to write into the track min register 114 from time to time as track crossing velocity varies during seek. As the track period counter 118 counts up, any MIRR rising edge that occurs before the track period counter reaches the value in the track min register is deemed as spurious edge of a spurious MIRR signal and ignored. As aforementioned, MIRR is high when beam spot is positioned at the mirror and low when the beam spot is positioned at track. Spurious edges occur more frequently at mirror and rarely at track, therefore setting track min register 118 to approximately greater than 60% to 80% of the valid track period effectively rejects most spurious MIRR edges. This value may be adjusted. FIG. 6 illustrates the cause of spurious edge and shows why it occurs more frequently when MIRR is high.

Figure 6B:
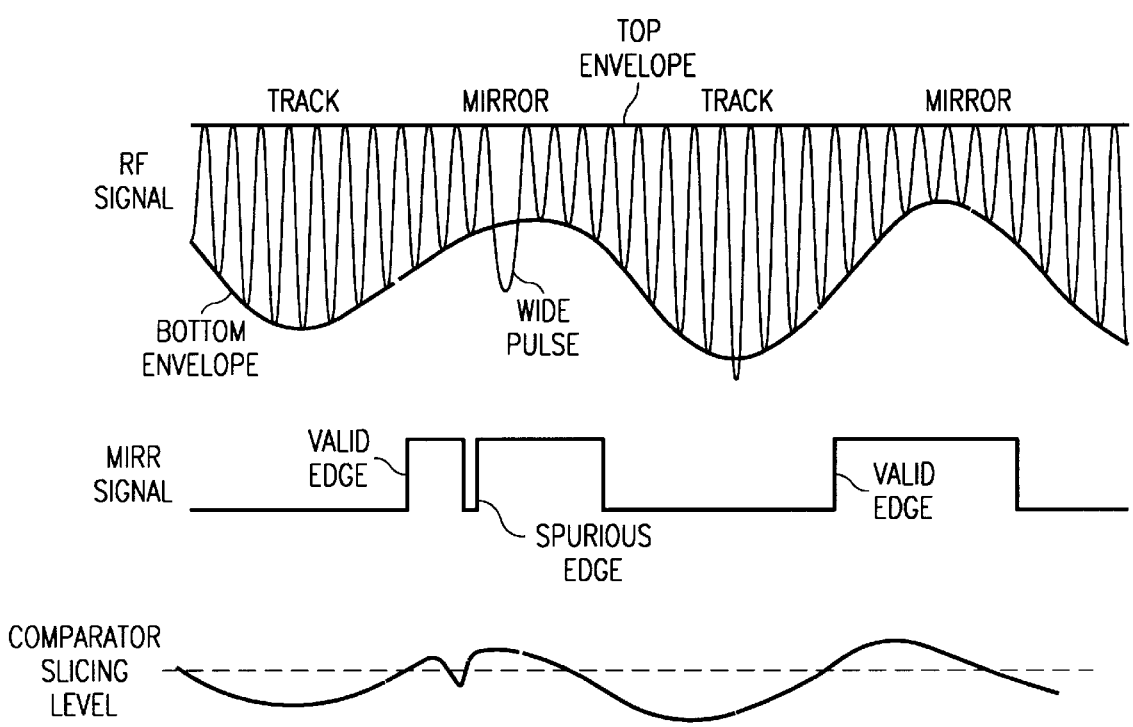
FIG. 6b illustrates a waveform of the present invention.

The RF signal includes pulses that has widths varying from 3T to 11T for CD and 14T for DVD. T is a time interval which is 231.5 ns for CD played at 1× speed and T for DVD is 38.2 ns for DVD played at 1× speed. FIG. 6(*a*) shows one possible implementation of MIRR generating circuit 320 the RF signal input through a lowpass filter whose output is fed into a comparator. The lowpass filter may be a single-pole lowpass filter. The comparator outputs the MIRR signal. As the RF signal passes through the lowpass filter, the pulses with width of 3T are attenuated much more than the pulse which has a large width for every 11T or the 14T pulses. For high-speed seek, track crossing can be as high as 1 MHz or above. The lowpass filter cutoff frequency therefore may be set to above this frequency. This means that the wide pulse of the RF signals are not attenuated much as the RF signal passes through the lowpass filter. This is shown in the bottom curve in FIG. 6(b). As a result, a discontinuity appears in the output of the comparator. This discontinuity results in the spurious MIRR signal.

What is claimed is:

1. A track counter circuit for counting tracks, comprising;
   a circuit for generating a first signal indicating a first track has been crossed and a second signal indicating a second track has been crossed after said first track;
   a circuit for determining when a third track should have been crossed and generating a missing signal to indicate said third track;
   a circuit for determining a valid track period based on said first signal and said second signal;
   a circuit for maintaining said valid track period when said missing signal is generated.

2. A track counter circuit for counting tracks as in claim 1 wherein said first signal is a MIRR signal.

3. A track counter circuit for counting tracks as in claim 1 wherein said second signal is a MIRR signal.

4. A track counter circuit for counting tracks as in claim 1 wherein said circuit for maintaining said valid track period includes a circuit to maintain said valid track period when a spurious signal is generated.

5. A method for counting tracks, comprising the steps of;
   generating a first signal indicating a first track has been crossed and a second signal indicating a second track has been crossed after said first track;
   determining when a third track should have been crossed and generating a missing signal to indicate said third track;
   determining a valid track period based on said first signal and said second signal, and;
   maintaining said valid track period when said missing signal is generated.

6. A method for counting tracks as in claim 5, wherein said step of generating including the step of generating is a MIRR signal.

7. A method for counting tracks as in claim 5, wherein said step of generating including the step of generating a MIRR signal.

8. A method for counting tracks as in claim 5, wherein said step of maintaining said valid track period includes a step of maintaining said valid track period when a spurious signal is generated.

* * * * *